A. RUHLAND.
GRINDING MILL.
APPLICATION FILED NOV. 9, 1908.
916,786.
Patented Mar. 30, 1909.
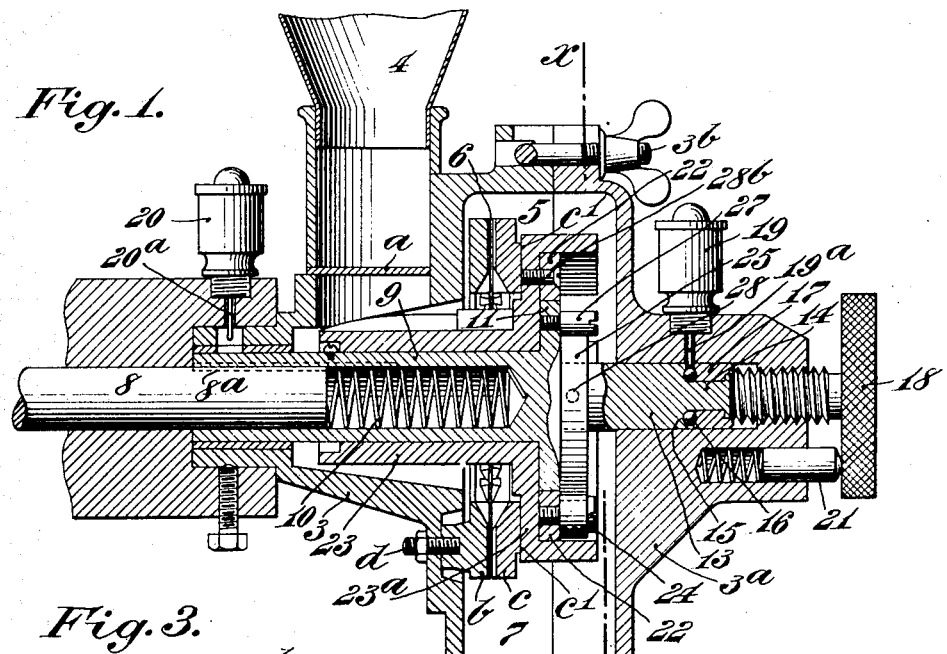
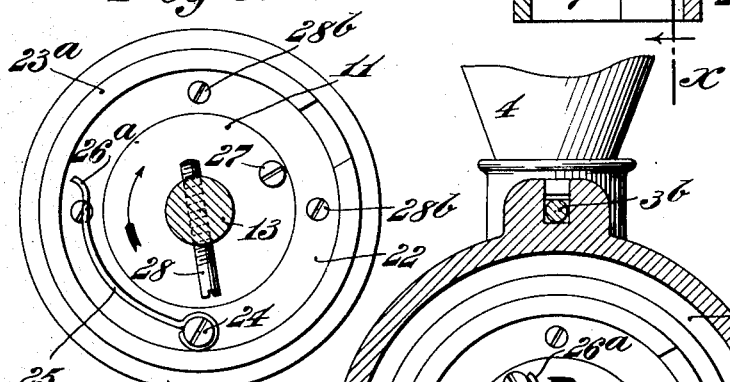
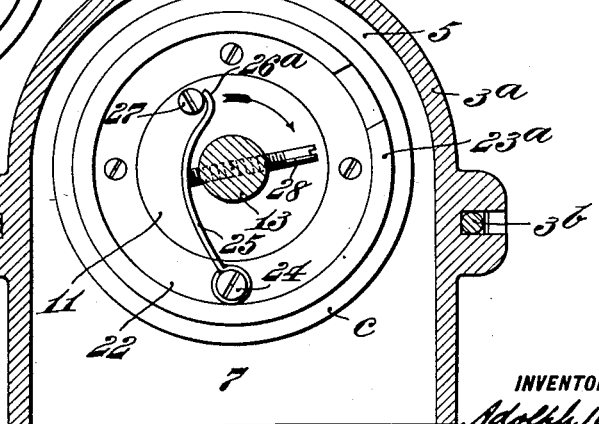
WITNESSES:
Thomas M. Smith
G. M. Connerton
INVENTOR
Adolph Ruhland,
BY
J. Walter Douglas
ATTORNEY.

UNITED STATES PATENT OFFICE.

ADOLPH RUHLAND, OF PHILADELPHIA, PENNSYLVANIA, ASSIGNOR TO CHARLES E. TROEMNER, OF PHILADELPHIA, PENNSYLVANIA.

GRINDING-MILL.

No. 916,786.      Specification of Letters Patent.      Patented March 30, 1909.

Application filed November 9, 1908. Serial No. 461,623.

*To all whom it may concern:*

Be it known that I, ADOLPH RUHLAND, a citizen of the United States, residing at the city of Philadelphia, in the county of Philadelphia and State of Pennsylvania, have invented certain new and useful Improvements in Grinding-Mills, of which the following is a specification.

My invention relates to means operating to automatically release the grinding means of a coffee or other mill when foreign matter as nails, sticks or the like, contact with the working faces of the fixed and movable members of such grinding means of the mill, interfering with uniform workings thereof.

The nature, scope and characteristic features of my invention will be more fully understood from the following description taken in connection with the accompanying drawings forming part hereof, in which—

Figure 1, is a vertical longitudinal section of a power operated coffee or similar mill having a driven shaft and means for automatically disengaging the grinding means of the mill when matter foreign to that to be ground contacts with the working faces of the said means, the said means embodying as to particular constructive arrangement, main features of my present invention. Fig. 2, is a vertical sectional view on the line $x, x$, of Fig. 1 of the automatic disengaging means in inoperative position, as far as affecting the grinding-means of the mill; and Fig. 3, is a similar view of the automatic disengaging means in operative position for affecting the said grinding means, but with the casing removed and the spring finger shown released from its stop to permit only the driven shaft of the mill to revolve and the movable member of the grinding means of the mill to become inoperative so far as the grinding of matter by the fixed and movable members thereof.

Referring to the drawings 3 and 3ª, represent sectional casings housing working parts of an ordinary power operated coffee mill.

4, is the feed hopper provided therewith a slide $a$. The hopper 4, merges into a chamber 5, in which is placed grinding means 6. This means consists of two toothed disks $b$ and $c$, facing each other as shown in Fig. 1. One of the tooth disks $b$, of the grinding means is fixed to the casing 3, by means of bolts or other fastening means $d$, while the other disk $c$, is detachably mounted on the rotary member of the mill. From the inclined and straight walls of the main grinding chamber 5, and extending downward therefrom, is an outlet throat 7.

8, is a driven shaft adapted to be operated from an electric or other motor, not shown. The shaft 8, is splined at 8ª, to a sleeve 9. At one end bears against a coiled spring 10, mounted in the said sleeve. The sleeve 9, is offset at 11, and divided into a circular extension 13, to form a bearing in the removable casing 3ª. The end of the bearing extension 13, is recessed to form a flanged end 14, and around the offset portion 15, of which are arranged balls 16, held to place by means of a recessed gasket 17, as clearly illustrated in Fig. 1.

18, is a jam-nut arranged to engage the flanged end of the bearing 13, to tighten the bearing 13, and also the sleeve 9, on the shaft 8, under the tension of the spring 10, to reduce friction to a minimum in operation of the said parts as illustrated in Fig. 1.

19 and 20, are lubricating devices for the sleeve 9, and shaft 8. These devices by feed pipes 19ª and 20ª, extend downward through the casings 3 and 3ª, to keep by periodic supply of the lubricant, the shaft 8, splined to the sleeve 9, with its ball bearings 16, in good working condition.

21, is a spring tension pin arranged to enter one of a series of openings intended to be provided on the inner side of the head of the jam-nut 18.

22, is a ring secured by means of screws 28ᵇ, to the cup-shaped end 23ª, of an outer sleeve 23, mounted on the inner sleeve 9, of the shaft 8, and bearing against the wall $c'$, of the grinding-means 6. Projecting from the ring 22, is a post 24, having a flat curved spring-finger 25, Figs. 2 and 3, arranged to embrace at one end the post 24, and at the other end formed into a curved lip 26ª, so as to bear against the post 27, projecting from the flanged end 11, of the sleeve 9, to revolve with the shaft 8, under regulation of the tension pin 28, passing through the extension 13, of the sleeve 9, as fully illustrated in Figs. 2 and 3. The position of the spring finger 25, in Fig. 2, being that it occupies during the ordinary grinding of coffee or the like in the mill but when foreign matter is brought into contact with the toothed disks $b$ and $c$, of the said grinding means 6, of the mill the spring finger 25, automatically releases itself from engagement with the post 27, and assumes the position as shown in Fig. 3, to enable the movable member c, of the grinding-means 6, to become inoperative with respect to fixed member b, to prevent breaking the teeth of the respective disks of the said grinding means.

When foreign matter is carried into the grinding means 6, with the coffee grains or the like at once the undue friction brought to bear against the surfaces b and c, of the said grinding means 6, causes the inner sleeve 9, with the shaft 8, splined thereto to turn and thus force the spring finger 25, automatically away from the post 27, so as to occupy the position as shown in Fig. 3, and therewith the toothed disk c, of the grinding-means 6, to become inoperative and only the driving means for instance the sleeve 9 and disk 11, to revolve as will be clearly understood from Fig. 1. By stopping the mill and shifting the detachable casing 3ª, by the lock-nuts 3ᵇ, as fully illustrated in Fig. 1, the spring-finger 25, can be again returned to the position as shown in Fig. 2, for starting up again the mill for its ordinary grinding operations. The tension of the spring-finger 25, against the post 27, can at all times be readily controlled by means of the threaded pin 28, as shown in Figs. 2 and 3.

Having thus described the nature and object of my invention, what I claim as new and desire to secure by Letters Patent is:—

1. In a grinding mill, means to automatically disengage grinding means of such mill, consisting of driving means, a sleeve, a movable member of said grinding means mounted on said sleeve, a post connected with said driving means and a spring finger secured to said sleeve and normally contacting with said post, substantially as and for the purposes described.

2. In a grinding mill, means to automatically disengage the grinding-means of such mill, comprising a driving means, a sleeve, a movable member of said grinding means mounted on said sleeve, a post connected with said driving means, a spring finger connected with said sleeve and adapted to contact with said post and a threaded pin adapted to variably regulate the tension of the spring finger in contact with said post, substantially as and for the purposes described.

In witness whereof, I have hereunto set my signature in the presence of two subscribing witnesses.

ADOLPH RUHLAND.

Witnesses:
J. WALTER DOUGLASS,
THOMAS M. SMITH.